Nov. 3, 1959 R. T. GLASS 2,911,121
CONVEYOR-TYPE APPARATUS FOR DEFROSTING FROZEN
CONFECTIONS AND REMOVING THEM FROM MOLDS
Filed Dec. 11, 1957 3 Sheets-Sheet 3
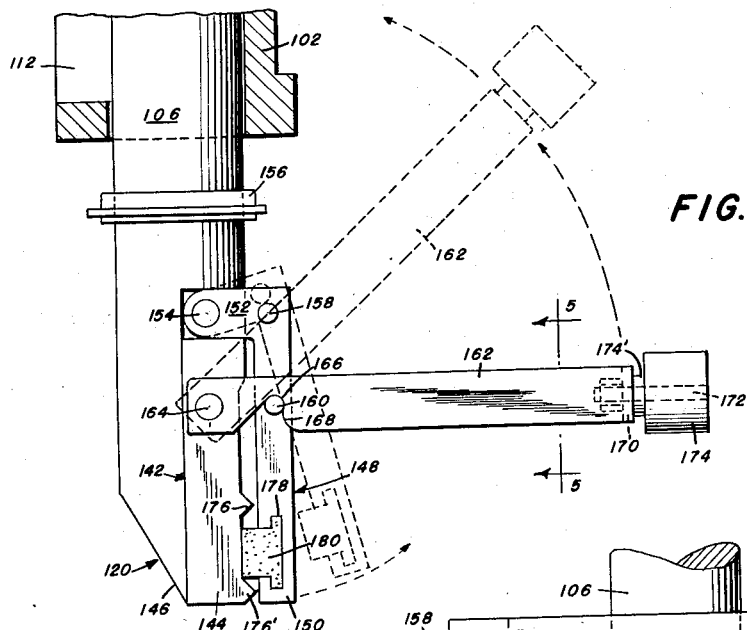
INVENTOR
ROBERT T. GLASS
BY *Beale & Jones*
ATTORNEYS

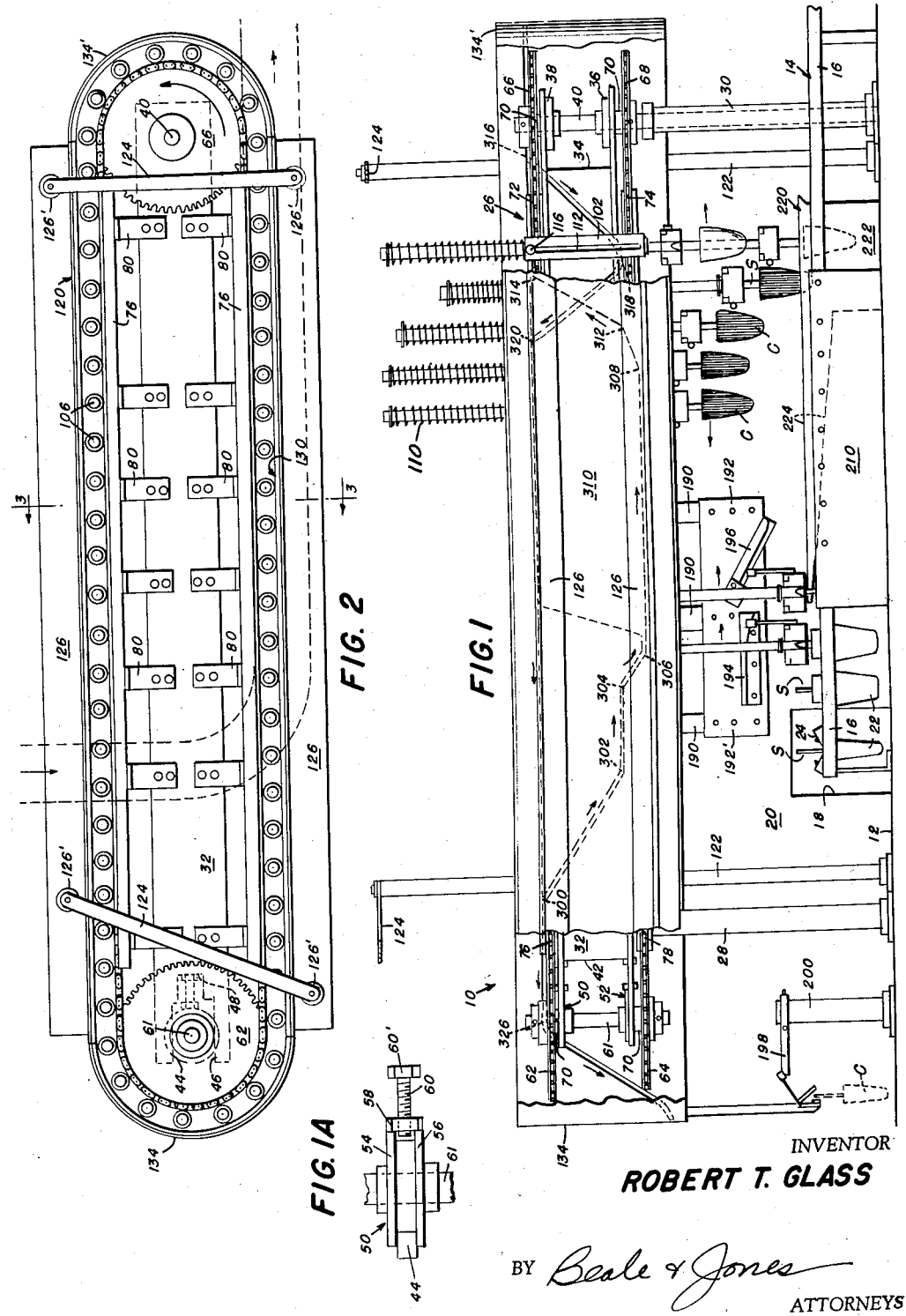

United States Patent Office 2,911,121
Patented Nov. 3, 1959

2,911,121

CONVEYOR-TYPE APPARATUS FOR DEFROSTING FROZEN CONFECTIONS AND REMOVING THEM FROM MOLDS

Robert Taylor Glass, Austin, Tex.

Application December 11, 1957, Serial No. 702,086

8 Claims. (Cl. 214—300)

This invention relates to an apparatus for defrosting frozen confections and removing them from their molds. More specifically, this invention relates to a conveyor-type apparatus comprising means adapted to defrost frozen confections in their molds and to remove them from their molds after the necessary amount of defrosting has transpired. Additionally, the apparatus provides means for dipping such frozen confections in a coating fluid, and releasing them for packaging.

In the prior art, there have been developed conveyor-type apparatuses for removing frozen confections from their molds. A number of these, such as that shown in the U.S. Patent to Robb 1,960,456, granted May 29, 1934, require that the forward motion of the molds along a mold conveyor be interrupted while removal from the mold or spur takes place. This interruption is disadvantageous because it results in wear on the moving parts of the apparatus, requiring a sudden start after the stop. It also requires special intermittent drive means.

In my application Serial No. 669,728, filed July 3, 1957, I disclose and claim a conveyor-type apparatus for removing frozen confections from their molds which does not necessitate the interruption of the forward movement of the confection. The apparatus of the present application also has this characteristic. This is not the only advantage of the present device, however. Another advantage of the present device overcomes a shortcoming present in all such devices in the prior art.

In the conveyor-type confection-withdrawing machines in the prior art, the molds are each first defrosted to the point where the confection is melted away from the sides of the mold. Next, after defrosting, a gripping device engages the stick of the confection and pulls the confection from its mold. In this type of arrangement disadvantages are inherent. First, in many cases, more defrosting transpires than is really necessary to liberate the confection from its mold, thus causing a waste of confection material which remains in melted form in the sides of the mold. Second, in the case where there is an imperfection in the mold—which is occasionally inevitable—insufficient defrosting transpires and the insensitive upward pull of the gripping device "strips" the stick out of the confection, or in pulling upwardly, loses grip on the stick, thus wasting all of the confection in that mold and necessitates supervision and possibly a shutdown of the machine to rectify the situation.

In the device of my invention the gripping device engages the stick of the confection and exerts a slight upward force during the defrosting process. While the upward force is not quite sufficiently intense to "strip" the stick from the confection or to cause the disengagement of the gripper for the stick while the confection is still frozen in the mold, it is amply strong to raise the confection once it has been sufficiently melted about the side walls of the mold to liberate it therefrom. Thus, no matter how imperfect the mold spur with which the confection is associated may be, my device raises the confection as soon as the minimum of defrosting necessary to liberate it has transpired. This effects great savings of confection material avoids "stripping" or disengagement of the gripper which would result in complete loss of the confection and require supervision and possibly a shutdown.

An object of this invention is, therefore, to provide a conveyor-type apparatus for automatically removing a frozen confection from its mold as soon as the minimum amount of defrosting necessary to liberate the confection from the side walls of the mold has transpired.

A further object of this invention is to provide an apparatus wherein an interruption in the forward progress of the confections is not necessary during the removal of them from their molds.

A further object of this invention is to provide an apparatus for removing frozen confections from their molds including novel cam-operated grip means adapted to releasably hold the confections during the removal.

A still further object of this invention is to provide completely automatic means by which frozen confections may be removed from their molds with a minimum loss of confection material.

Still another object of this invention is to provide apparatus for removing frozen confections from their molds and also for dipping the confections in a coating and subsequently releasing the confections.

This invention embodies other novel features, details of construction and arrangement of parts which are hereinafter set forth in the specification and claims, and illustrated in the accompanying drawings, wherein:

Fig. 1 is a side elevational view with a portion of the cam wall of the apparatus removed at either end to expose the second conveyor means and with a plurality of the puller assemblies removed to avoid over-complicating the drawing and showing in broken lines portions of the cam groove which are not visible;

Fig. 1a is an enlarged elevational view of the idler shaft bearing adjustment means;

Fig. 2 is a top plan view showing the path of the first conveyor in dotted lines;

Fig. 4 is an enlarged side view showing a detail of the clamping means;

Fig. 5 is an enlarge front view in section taken on the line 5—5 of Fig. 4;

Fig. 6 is a reduced view in perspective of the clamping means; and

Fig. 7 is a reduced diagrammatic perspective view of the cam wall showing a portion of the cam groove in broken lines.

Figure 3:
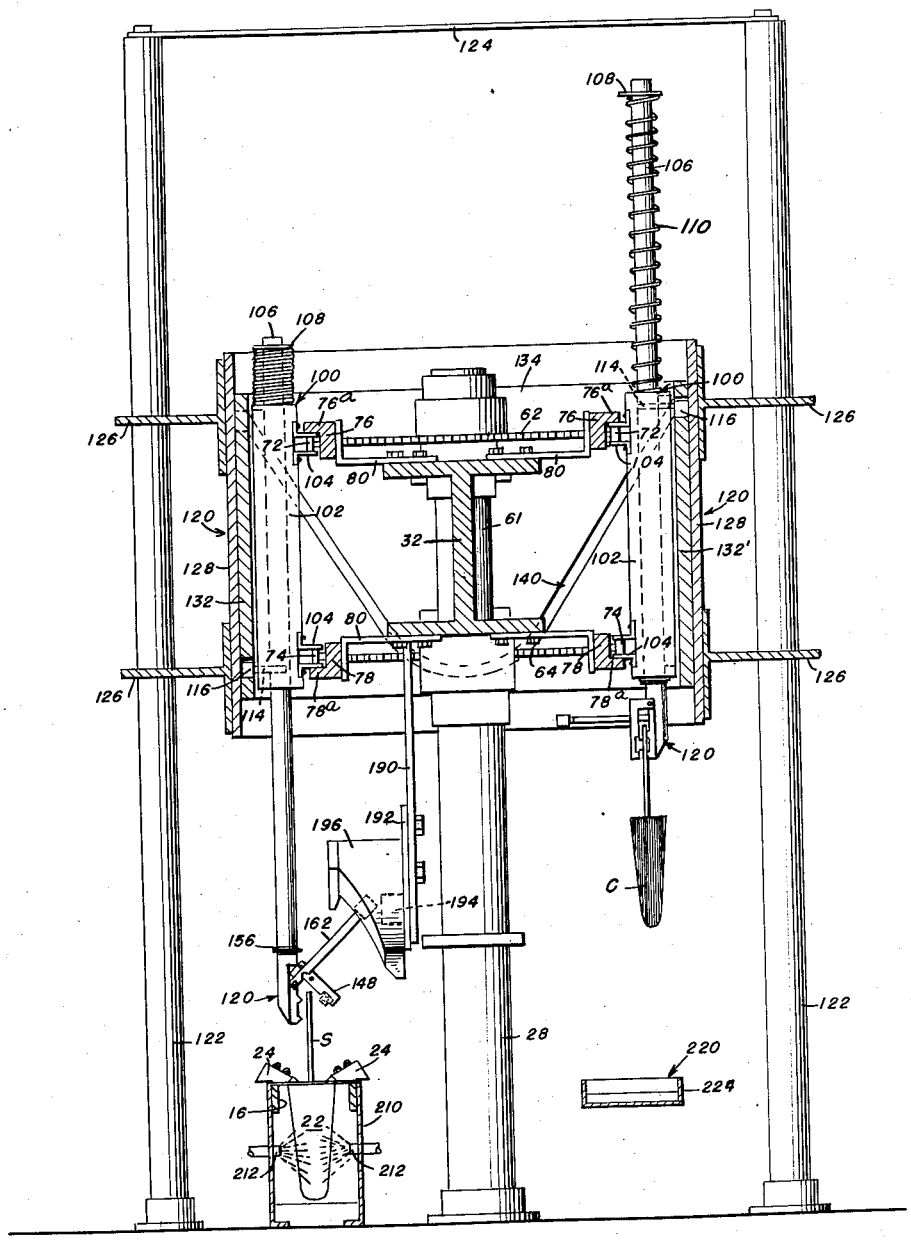
Fig. 3 is an end elevational view in section taken on the line 3—3 of Fig. 2.

Briefly, my invention is an apparatus for removing a frozen confection from its mold. It comprises a pair of conveyors—one carrying the mold, the other carrying clamping means adapted to engage a stick extending upward from the confection of said mold. The clamping means are supported on the second conveyor by spring means biasing it upwardly. Defrosting means are provided. In operation, first cam means lower the clamping means and second cam means close the clamping means on the stick as the confection passes through the defrosting zone. The spring mounting means then urge the confection upward and pulls it out of its mold after the minimum amount of defrosting necessary to liberate the confection from the side walls of the mold has transpired. Subsequently, cam means dip the confection into a coating and additional cam means release it.

More specifically, the structure is generally designated 10 in Fig. 1 and is mounted on a table top 12. A first conveyor 14 comprises a pair of spaced side-by-side rails 16 mounted on suitable brackets and emerging from a door 18 of a refrigerator housing 20. Shouldered on top of the rails are the opposite edges of each of a plurality of molds 22. Each mold 22 is provided with stick-holding means 24 which hold the confection stick S in place as the confection C is setting. The molds 22 are spaced at equal distance apart and are pulled along in single file by an endless chain (not shown). As the molds emerge from the refrigeration housing 20, the stick-holding means are opened by devices with which this invention is not concerned. This leaves the sticks frozen in the confection and extending upwardly therefrom in a disposition by which it may be grasped for removal of the confection from the mold.

The second conveyor, generally designated 26, is held up by a pair of supporting columns 28 and 30 spaced a substantial distance apart and mounted on and extending upward from the table top 12. The framework of the conveyor includes an horizontally disposed I-beam 32. As shown in Figs. 1 and 3, the upper end of the column 28 is directly attached by suitable mounting means to the undersurface of the lower foot of beam 32 near the left side thereof. The right end of the beam 32 carries a recess 34 in its medial web and each foot adjacent the end of the beam is apertured in vertical alignment and has mounted thereon a bearing 36 and 38 about the aperture. The supporting column 30 is hollow and a drive shaft 40 extends rotatably therein. Means not shown drive the lower end of the shaft 40 in timed relation with the travel of the first conveyor 14. The drive shaft 40 extends above the upper end of the supporting column 30 and through the bearings 36 and 38. Adjacent each bearing, the shaft 40 carries an enlarged collar, the upper annular shoulder of which abuts a downward thrust surface of the bearing to support the bearings 36 and 38 and, hence, the right end of the I-beam. Alternately, a set-screw can secure the inner race of the bearings 36 and 38 to the shaft 40.

As shown in Figs. 1 and 2, the medial portion of the I-beam 32 at the left side thereof is removed as at 42. The left end of each of the feet of the I-beam is notched longitudinally to present a pair of opposed edges 44 and 46 and an end surface 48 (see Fig. 2). Shaft bearing members 50 and 52 each has spaced flange members 54 and 56 on the upper and lower ends thereof respectively (see Fig. 1a). In assembly, one bearing slides into the notch in each foot respectively, and is supported therein as the flanges 54 and 56 engage the upper and lower surfaces of the edges 44 and 46. The spacing between the bearings 50 and 52 and the inner end surfaces 48 is adjustable as shown in Fig. 1a by means of a nut 58 secured at the rear of the bearings 50 and 52 to the flanges 54 and 56 and a bolt 60 in threaded engagement therewith having a head 60' in abutment with end surface 48.

An idler shaft 61 extends through the inner members of the bearings 50 and 52. Four sprockets 62, 64, 66, and 68 are provided, one being secured to each shaft 40 and 61 respectively on the opposite sides of the I-beam 32 respectively. Spacing rings 70 are positioned on the shafts 40 and 61 intermediate each sprocket and the I-beam 32, respectively and serve to avoid interference between the I-beam and the rotating sprockets or traveling chain. Each of the sprockets comprises a hub having a setscrew therein as shown adapted to secure it to its shaft.

The sprockets are paired in horizontal alignment and trained over the aligned pairs respectively are a pair of horizontally disposed roller chains 72 and 74. As can be gathered from Fig. 1, the sprockets 66 and 68 on drive shaft 40 are rotated thereby and the idler shaft 61, through the chains is likewise rotated.

Supporting the roller chains of the second conveyor are two pairs of chain guides 76 and 78. As best shown in Fig. 3, each of these guides comprises an elongated L-shaped member in cross section each having an outwardly extending horizontal leg. The upper members have their horizontal legs 76a on their upper ends and the lower members have their horizontal legs 78a on their lower ends. The L-shaped members are supported by a plurality of brackets 80 secured to the outer surface of the opposite feet of the I-beam 32 respectively. The brackets 80 extend outwardly from the I-beam and turn perpendicular to form a backing support for the L-shaped chain guides 76 and 78. The vertical feet of the chain guides 76 and 78 exert sufficient outward pressure on the chains 72 and 74 and the horizontal feet 78a of the lower L-shaped members exert sufficient supporting pressure on the lower chain run 74 to support the puller block assemblies 100 in the proper position.

At intervals equal to the intervals between the molds 22 carried by the first conveyor 14, chains 72 and 74 of the second conveyor 26 carry the puller block assemblies 100. As is best shown in Fig. 3, each puller block assembly 100 comprises a vertically disposed tubular block member 102 having fastened thereto at vertically spaced positions on its inside surface, pairs of spaced back-to-back L-shaped brackets 104. The distal ends of each pair of L-shaped brackets 104 are secured respectively to the upper and lower chains 72 and 74 in a secure fashion. Vertically reciprocatable within each tubular block member 102 is a shaft 106 having approximately the same outer diameter as the inner diameter of the bore of the tubular block member 102. About the upper end of each shaft is secured a washer 108, and disposed between the undersurface of the washer 108 and the upper surface of the tubular block member 102 is a spiral spring 110 biasing the shaft upwardly in the tubular block member 102. Each tubular block member 102 has an elongated vertical slot 112 in its outside and out through the slot 112 extends a pin 114 secured to the shaft 106. Each pin 114 is provided at its outer end with a cam roller 116 adapted to rotate thereon. At the lower end of each shaft is provided a clamp assembly 120.

A first cam means 120 serves to impart motion to the cam rollers 116 which in turn move the block assembly shafts 106 and is supported by a plurality of parallel uprights 122. The uprights 122 are mounted on the table top 12 and extend upwardly therefrom, two on the opposite sides of the second conveyor, respectively. At their upper ends the pairs of uprights at opposite ends of the second conveyor are linked together by a strap 124 or the like. Intermediate their upper and lower ends, each of the uprights is engaged by a plurality of horizontally disposed T-shaped elongate structural members 126. The stem of each of these members is apertured appropriately as at 126' and the apertures receive the uprights 122 and are not welded thereto. They are gripped like a clamp. The feet of the T-shaped members 126 are disposed inwardly of the uprights and are secured to an elongated closed wall cam support member 128. Secured within the support member 128, the cam 130 as is shown in Fig. 7 diagrammatically and in Fig. 1 in detail, comprises two parallel vertically disposed side members 132 and 132' having semi-circular end members 134 and 134' secured on either end respectively. The cam roller 116 on each of the puller block assemblies 100 fits into a cam groove 140 in the cam 130 and, as the second conveyor 26 is set in motion, each cam roller 116 moves its connected shaft 106 according to the direction imparted by the cam grooves as the conveyor progresses.

The clamp 120 at the lower end of each of the puller block assembly shafts 106 is best shown in detail in Fig. 4. It comprises a fixed jaw 142 including a plate 144 secured in a notched area of the lower end of the shaft 106. To streamline the lower end, the surface of the shaft may be beveled off as at 146 down to the lower edge of the fixed jaw. A movable jaw 148 is provided and includes a plate 150, said plate 150 having an arm 152 and 152' on the opposite sides at the upper end thereof respectively. Each arm 152 and 152' is apertured at its outer end and a trunnion 154 and 154' or other pivot means projects out from a recessed area in the opposite sides of the plate of the fixed jaw 142 and through said apertures to pivot the pivoted jaw 148. Thus, as shown in Fig. 4, the pivoted jaw 148 is freely swingable in relation to the fixed jaw 142.

A stop collar 156 is provided on the shaft above the jaw 142 in order that the pivoted jaw may operate freely without interference of the lower surface of the block member 102. An operating pin 158 is secured to said movable jaw 148 and extends outwardly from the side surface adjacent the top thereof. A second pin 160 is located intermediate the upper and lower extremities of the side surface. An operating lever 162 is provided and pivoted by pin means 164 to the side of the fixed jaw. It is notched as at 166 at the lower surface thereof and the notch is formed with a latch lip 168 adapted to latch over the pin 160. At its outer extremity, the arm 162 has perpendicularly outward extending length 170 which is apertured to receive a stub shaft 172 on which is journaled a cam follower wheel 174 with appropriate washer spacing means 174'.

In order better to grip the frozen confection sticks, the plate 144 comprising the fixed jaw 142 of the clamp carries a pair of spaced transverse horizontally disposed ridges 176 and 176'. As shown in Fig. 4, the movable jaw is recessed across the lower end thereof in a T-shaped recess 178 and carries a gum rubber or soft neoprene rubber gripper 180 having T-shape. This gripper 180 serves not only, in combination with the transverse grooves 176—176' in the fixed plate, to grip the sticks better and to accommodate sticks of various thicknesses, but also supplies opening pressure to make more effective the clamp latch 168.

Means for operating the arm 162 comprise second fixed cam means stationed about the travel path of the cam. Extending down from the undersurface of the I-beam 32 intermediate the ends thereof are a plurality of side-by-side arms 190. Secured across these arms near the lower ends thereof is a mounting plate 192 positioned over the first conveyor 14 (see Fig. 1). Adjacent the forward edge 192' of the plate is secured an opening cam block 194. It is disposed in the path of the cam follower wheel 174 as the shaft 106 is lowered. As the shaft 106 is lowered, the operating arm 162 is raised such that the upper surface thereof contacts and pushes upward the upper pin 158 (see Fig. 4) to open the pivoted jaw 148 as wide as possible. As the clamps progress along with the molds, one stick S from one mold comes in between the open and closed jaws of a clamp 120. After subsequent travel, the cam follower wheel 174 rolls off the trailing end of the opening cam 194 and allows the pivoted jaw 148 to drop. A closing cam block 196 is stationed on the mounting plate after the opening block. It is downwardly inclined and is contacted on its undersurface by the cam follower wheel 174 of the clamp 120. As the first and second conveyors progress, the cam closing block 196 forces the operating arm 162 down so that the notch 168 fits over the pin 160 with the lip 168 on the edge of the notch serving as a latch, locking it closed. Thus, the gripping of a frozen confection stick S by a clamp is effected.

Means for opening the clamps for releasing their confection after removal from the mold comprises a fixed block 198 which may be mounted on top of a stanchion 200 or the like carried by the table. The opening is effected as the cam follower wheel 174 hits the block 198 as cam groove 140 forces the shaft 106 downwardly.

Disposed in the path of the confection molds carried by the first conveyor is a defrosting unit 210. This unit is provided with side walls and partial end walls and a floor. As the molds pass through the defrosting unit, hot water is sprayed from the sides of the defrosting unit toward the molds 22 from outlet jets 212 communicating with an appropriate supply. On hitting the outside of the molds 22 the hot water drops down and drains from the defrosting unit by means not shown. By the defrosting unit, the molds are individually and successively heated to defrost the frozen confection within them away from the sides of the molds.

Alternately, electric heating means can be used to produce the desired heating effect on the molds. However, it has been found that a spray of hot water is the most rapid trouble-free and economical way to defrost the molds.

On the opposite side of the second conveyor from the defrosting unit is disposed a dip pan 220. The pan comprises a deep area 222 adapted to be filled with coating material of some sort and a gradually shallowing shelf area 224 adapted to catch driplets descending from the dipped confection and to conduct them back into the deeper portion 222 of the dip pan. The shallower area is disposed underneath the travel of the frozen confection. Liquid level maintaining means may be used in connection with this dip pan lest the level of coating material therein fall too low to give adequate coverage to the confection.

The configuration of the groove 140 in the cam wall 130 supported within the cam support 128 is shown in Fig. 7 diagrammatically. This view, when combined with side elevational view of Fig. 1, gives a good idea of the operation of the device. To best follow the path of the frozen confection, it is well to consider the travel of a single clamp 120 commencing when the cam roller 116 on its shaft 106 is disposed at point 300 in the cam groove. With the second conveyor 26 and first conveyor 14 traveling at approximately the same speed, the mold 22 with which the clamp 120 is to be associated is rounding the curve below the second conveyor 26 having just emerged from housing 20. In the meantime, the cam roller 116 is being forced downwardly by the downwardly inclined slope of the cam groove 140 toward point 302. With the clamp 120 hovering above the stick with which it is to be associated to clear obstructions, the cam roller 116 moves along the flat portion of the groove toward point 304. Subsequently, with the clamp traveling over the stick S the inclined portion of the groove toward point 306 forces the clamp downwardly over the stick. Simultaneously, the cam follower wheel 174 on the clamp operating arm 162 contacts and is shoved upwardly by the clamp opening cam block 194 as the shaft 106 goes down. Then with the clamp and shaft traveling level as the roller 116 approaches point 308, the clamp operating arm cam follower wheel 174 contacts the underside of the closing cam block 196 which forces the arm downward to latch the clamp to the stick S.

The downward motion of the shaft 106, effected by the downward inclining of the cam groove 140, has been against the force of the spiral spring 108 associated with the puller block assembly above the clamp. As the clamp and mold enter the defrosting unit 210, the cam groove 140 widens upwardly to form area 310 so that the groove 140 no longer holds down the shaft and the only thing holding the shaft 106 and clamp 120 down is the adherence of the frozen confection C to the side walls of its mold. As pointed out above, when enough frozen confection C has melted about the walls of its mold 22 the confection is liberated and the spiral spring 108 of the puller block assembly forces the clamp upward, withdrawing the confection C from its mold. The widened area 310 of the cam groove 140 extends for a considerable length to accommodate the variables causing differences in the points at which successive confections are liberated.

In almost all cases the shaft 106 with its confection will rise up before the roller 116 reaches point 308. If it does not, however, the lower surface of the groove 140 at point 308 gradually inclines (at about 30 degrees from horizontal) to apply a strong pulling force to the clamp 120 to withdraw the confection C. From point 312 to point 314 the lower surface of the groove 140 raises more abruptly.

By the time roller 116 is at point 314, the clamp 120 is well above the first conveyor 14 and can continue back over it without interfering therewith. At this point the puller block assembly is carried around the sprockets 66 and 68 over the first conveyor. During this period the outer surface of the confection refreezes or "dries" from its melted state due to the coldness of the rest of the confection. Subsequently, at point 316 the cam groove 140 abruptly declines to point 318 to force its associated shaft 106 downwardly, dipping the confection C in a coating in the dip pan 220. Having been dipped, the confection is raised as the groove inclines up to point 320. The travel of the confection C is then leveled as excess coating drips off into the inclined drip shelf 224. The remaining coating also "dries" with the help of a blast of cold air, if necessary. After the roller reaches point 322 in the cam groove, it is depressed as the groove declines to point 324. Near the bottom of this depression, the clamp operating arm cam follower wheel 174 engages the block 198 to unlatch the clamp 120, open it, and allow the confection C to fall therefrom. It is at this point where a packaging or wrapping or bagging machine device may be conveniently installed. Alternately, the dip between points 322 and 324 need not be executed with certain packaging devices. Instead, the clamp 120 need merely open at the higher level.

After the clamp 120 is opened and the confection has dropped or been removed therefrom, it is carried upward as the cam groove rises to point 326 and levels off ready for commencing the cycle again at point 300.

It will be obvious to those skilled in the art that I have invented a new and improved conveyor-type frozen confection pulling device adapted to withdraw the confection from its mold with the least possible defrosting and to avoid the "stripping" of the stick from its confection or the disengagement of the clamp from the stick. My device is a great advance also in that it allows the removal of the confections from their molds without requiring intermittent motion of the conveyors.

While this invention has been shown in but one form, it is obvious to those skilled in the art that it is not so limited but is susceptible of various changes and modifications without departing from the spirit and scope of the claimed invention.

I claim:

1. An apparatus for removing frozen confections from molds comprising a first conveyor carrying a plurality of said molds in single file, said molds each having a confection frozen therein, each of such confections having a stick frozen therein and extending upwardly therefrom, a second conveyor comprising a pair of sprockets in horizontally aligned relation over said first conveyor, and an endless chain trained over said sprockets, said first and second conveyors being driven at substantially the same speed, said second conveyor having a plurality of evenly spaced puller block assemblies, each of said puller block assemblies comprising a vertically disposed tubular block member secured to said chain, a shaft slidably fitting within said tubular member, cam-operable clamp means on the lower end of said shaft, spring means biasing said shaft upwardly in said tubular member, first cam means adapted to lower said shafts successively against the force of said spring means to a position where said clamp on the lower end of said shaft is adapted to be closed on one of said sticks, second cam means supported adjacent the path of said clamps adapted to close the clamp in such position, said shafts being free to rise under the force of the spring once the clamps engage the sticks, defrosting means adapted to heat said molds as they pass adjacent the position wherein the clamps engage the sticks, whereby when said confections are each defrosted adjacent the sides of its mold, it is lifted from its mold by the spring associated with the clamp engaging the stick.

2. An apparatus as described in claim 1 wherein an extension of said first cam means is adapted to lower each shaft successively after the confections have been withdrawn to dip each confection in a coating bath.

3. An apparatus as described in claim 2 wherein cam means are provided to open the latched clamp members to release the confections.

4. An apparatus as described in claim 1 wherein said first cam means comprise an oblong wall disposed around said second conveyor, said wall having a cam groove about the inside face thereof, and each puller block assembly shaft carries an outwardly extending cam follower riding in said cam groove.

5. An apparatus as described in claim 1 wherein one of said sprockets is adjustably mounted so that its distance from the other sprocket may be adjusted.

6. An apparatus for removing frozen confections from molds comprising a first conveyor carrying a plurality of said molds in single file, said molds each having a confection frozen therein, each of such confections having a stick frozen therein and extending upwardly therefrom, a second conveyor operable above said first conveyor, said first and second conveyors being driven at substantially the same speed, said second conveyor mounting for vertical reciprocation a plurality of horizontally spaced vertically disposed shafts, cam-operable clamp means on the lower end of each of said shafts, spring means respectively biasing each of said shafts upwardly, first cam means adapted to lower each of said shafts successively against the force of its spring means to a position where said clamp on the lower end of said shaft is adapted to be closed on one of said sticks, second cam means supported adjacent the path of said clamp adapted to close each clamp as it reaches said position, said shafts each being free to rise under the force of its spring once its clamp engages the stick, defrosting means adapted to heat the molds as they pass adjacent the position wherein the clamps engage the sticks, whereby when each of said confections is defrosted adjacent the sides of its mold, it is lifted from its mold by the spring associated with the clamp engaging the stick.

7. An apparatus for removing frozen confections from molds comprising a first conveyor carrying a plurality of said molds in single file, said molds each having a confection frozen therein, each of such confections having a stick frozen therein and extending upwardly therefrom, a second conveyor operable above said first conveyor, said first and second conveyors being driven at substantially the same speed, said second conveyor having a plurality of horizontally spaced puller block assemblies, each of said puller block assemblies comprising a vertically disposed tubular block member secured to said second conveyor, a shaft slidably fitting within said tubular member, cam-operable clamp means on the lower end of each of said shafts, spring means respectively biasing each of said shafts upwardly in its tubular member, first cam means adapted to lower each of said shafts successively against the force of its spring means to a position where said clamp on the lower end of said shaft is adapted to be closed on one of said sticks, second cam means supported adjacent the path of said clamp adapted to close each clamp as it reaches said position, said shafts each being free to rise under the force of its spring once its clamp engages the stick, defrosting means adapted to heat the molds as they pass adjacent the position wherein the clamps engage the sticks, whereby when each of said frozen confections is defrosted adjacent the sides of its mold, it is lifted from its mold by the spring associated with the clamp engaging the stick.

8. An apparatus for removing frozen confections from molds comprising a first conveyor carrying a plurality of said molds in single file, said molds each having a confection frozen therein, each of such confections having a stick frozen therein and extending upwardly therefrom, a second conveyor operable above said first conveyor, said first and second conveyors being driven at substantially the same speed, said second conveyor mounting for vertical reciprocation a plurality of horizontally spaced vertically disposed shafts, clamp means on the lower end of each of said shafts, spring means respectively biasing each of said shafts upwardly, first cam means adapted to lower each of said shafts successively against the force of its spring means to a position where said clamp on the lower end of said shaft is adapted to be closed on one of said sticks, means to close each clamp as it reaches said position, said shafts each being free to rise under the force of its spring means once its clamp engages the stick, defrosting means adapted to heat the molds as they pass adjacent the position wherein the clamps engage the sticks, whereby when each of said confections is defrosted adjacent the sides of its mold, it is lifted from its mold by the spring associated with the clamp engaging the stick.

References Cited in the file of this patent

UNITED STATES PATENTS

| | | |
|---|---|---|
| 2,166,380 | Taylor | July 18, 1939 |
| 2,696,927 | Copping | Dec. 14, 1954 |